United States Patent [19]

Baker

[11] 4,284,840
[45] Aug. 18, 1981

[54] SERVICE POLE ASSEMBLY

[75] Inventor: Charles T. Baker, West Hartford, Conn.

[73] Assignee: The Wiremold Company, West Hartford, Conn.

[21] Appl. No.: 84,890

[22] Filed: Oct. 15, 1979

Related U.S. Application Data

[63] Continuation of Ser. No. 806,770, Jun. 15, 1977, abandoned.

[51] Int. Cl.³ .............................................. H02G 3/04
[52] U.S. Cl. .................................... 174/48; 248/218.4
[58] Field of Search .......................... 174/48, 49, 45 R; 52/126, 263, 721, 40; 248/218.4, 219.1, 219.2; 362/431

[56] References Cited

U.S. PATENT DOCUMENTS

| | | | |
|---|---|---|---|
| 1,129,285 | 2/1915 | Fort | 362/431 X |
| 3,082,290 | 3/1963 | Ohmit | 174/49 |
| 3,104,067 | 9/1963 | Stiffel | 362/431 X |
| 3,143,331 | 8/1964 | Corey | 248/219.1 X |
| 3,197,631 | 7/1965 | Jensen | 174/45 R X |
| 3,609,211 | 9/1971 | Van Herk | 174/49 |
| 3,888,282 | 6/1975 | Liddall | 174/48 X |
| 3,889,044 | 6/1975 | Flachbarth et al. | 174/48 |
| 3,974,618 | 8/1976 | Cortina | 52/126 X |

*Primary Examiner*—Gene Z. Rubinson
*Assistant Examiner*—D. A. Tone
*Attorney, Agent, or Firm*—Hayes & Reinsmith

[57] ABSTRACT

An assembly is disclosed featuring a utility service pole bottomed on a floor of a room, a pole hanger fixed to a ceiling suspension member and a connector therebetween which not only serves to cooperate with the hanger to maintain the service pole in an upright position but additionally supports the hanger for movement relative to the service pole to automatically compensate for relative movement of the ceiling suspension member and the floor toward and away from each other without lifting or otherwise distorting the service pole.

7 Claims, 5 Drawing Figures

U.S. Patent Aug. 18, 1981 4,284,840
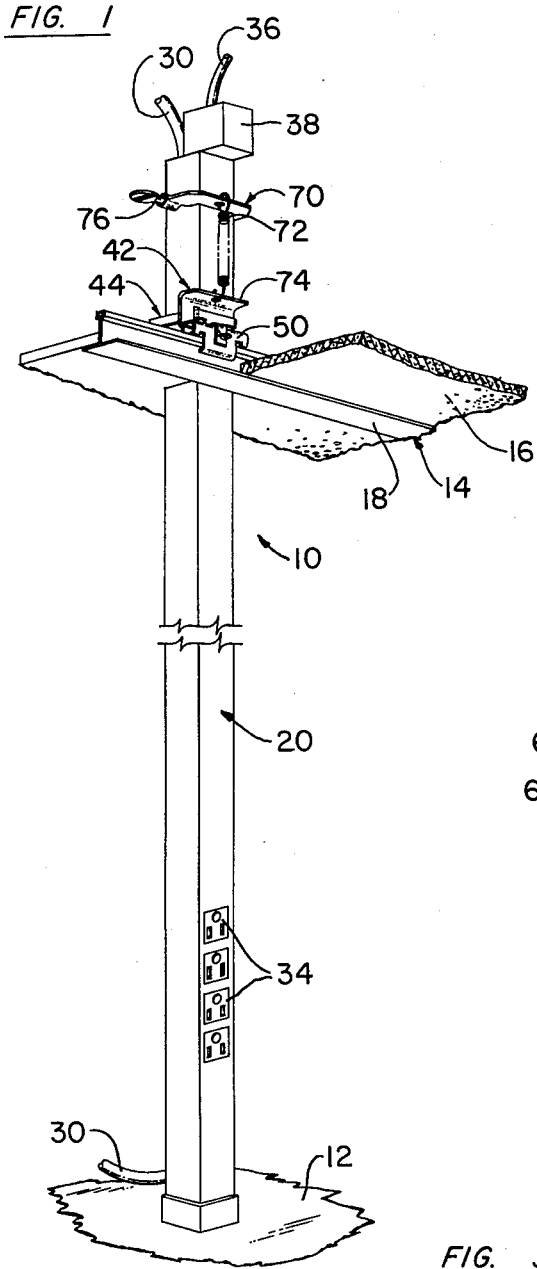
FIG. 1
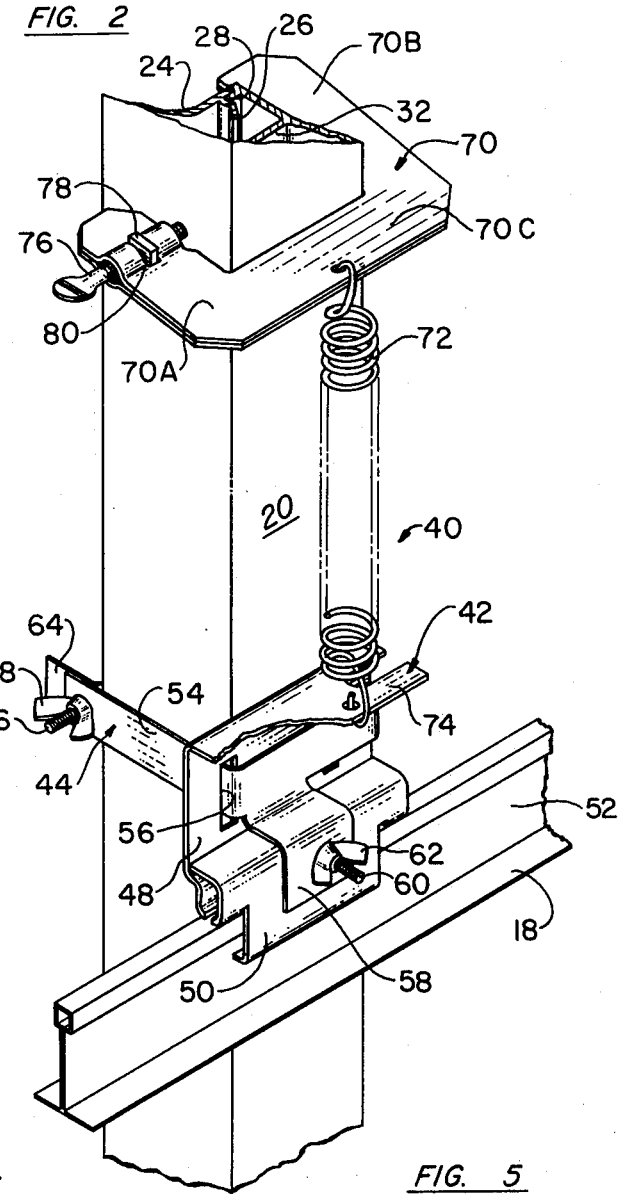
FIG. 2
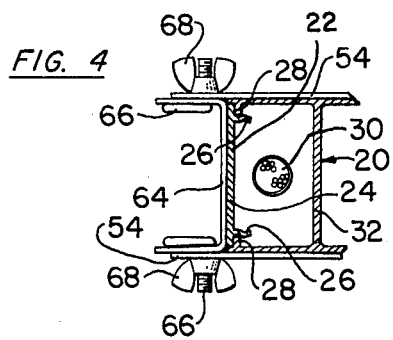
FIG. 3
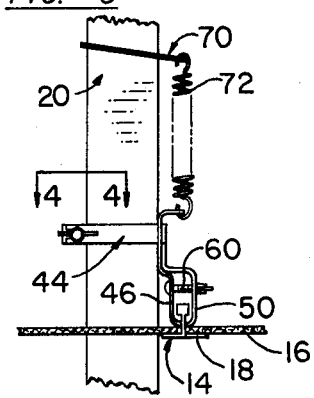
FIG. 4
FIG. 5

SERVICE POLE ASSEMBLY

This is a continuation of application Ser. No. 806,770, filed June 15, 1977, now abandoned.

FIELD OF THE INVENTION

This invention generally relates to power and communications distribution systems and particularly concerns a service pole assembly for providing such utility services.

BACKGROUND OF THE INVENTION

In service poles of the type providing utilities such as power and telephone services to a point-of-use in a room from an overhead distribution system, a troublesome problem has been encountered in the lifting of the service pole off the floor or its being distorted due to downward forces imposed on the service pole as a result of relative movements of the ceiling to which the service pole is connected. The service pole is normally secured to the floor and supported above the ceiling by a T-bar or tie-rod hanger as illustrated in U.S. Pat. No. 3,889,044 issued June 10, 1975 in the name of Flachbarth et al. However, in poles of the type shown in the referenced patent, suspended ceiling deflections under load caused by distortion of the true ceiling in turn have distorted the poles due to the downward force exerted by the ceiling on the pole and in certain instances the poles may be actually lifted off the floor when such a suspended ceiling is deflected upwardly.

OBJECTS OF THE INVENTION

A primary object of this invention is to provide a new and improved service pole assembly which will permit the suspended ceiling to move without applying any substantial load on the pole or otherwise causing any corresponding and undesired pole displacement.

Another object of this invention is to provide such a service pole which is automatically self-compensating for relative movements of the floor and ceiling toward and away from each other without requiring any manual servicing under such conditions to effect vertical adjustment of the service pole.

A further object of this invention is to provide an assembly of the above described type which features a construction particularly designed to effect a highly stabilized structure upon being installed.

Yet another object of this invention is to provide such an assembly which is economical to manufacture and is particularly quick and easy to install for providing reliable service over extended periods of time.

Other objects will be in part obvious and in part pointed out more in detail hereinafter.

SUMMARY OF THE INVENTION

In the service pole assembly of this invention the pole itself is bottomed on the floor and extends above a suspended ceiling. A pole hanger of the assembly is fixed to a ceiling suspension member and a connector is provided between the hanger and the pole. The connector cooperates with the hanger in supporting the pole in an upright position while additionally providing for relative movement of the hanger longitudinally along the pole in response to corresponding relative movement of the ceiling suspension member and the floor toward and away from each other.

A better understanding of this invention will be obtained from the following detailed description and the accompanying drawing of an illustrative application of the invention.

BRIEF DESCRIPTION OF THE DRAWING

FIG. 1 is a perspective view, partly broken away and partly in section, showing a service pole assembly incorporating this invention as being installed in a room;

FIG. 2 is an enlarged isometric view, partly broken away and partly in section, illustrating an upper portion of the assembly of FIG. 1 disposed above a ceiling;

FIG. 3 is a reduced fragmentary side elevational view which is partly in section and which has certain parts removed for clarity in schematically illustrating a normal position of the assembly upon being installed;

FIG. 4 is an enlarged cross sectional view taken generally along line 4—4 of FIG. 3; and FIG. 5 is a view similar to FIG. 3 illustrating a position of the assembly upon deflection of the ceiling under load.

DESCRIPTION OF A PREFFERED EMBODIMENT

Referring to the drawing in detail, service pole assembly 10 of this invention is particularly suited to be installed in a room having a floor 12 and ceiling 14 of a suspended type having ceiling panels 16 supported by conventional ceiling suspension members such as tierods or the illustrated inverted T-bar 18.

Assembly 10 utilizes an elongated hollow pole 20 having a generally square cross section and a length sufficient to extend from floor 12 upwardly to project through a panel 16 in ceiling 14 adjacent T-bar 18. The bottom of pole 20 is normally fastened to floor 12 by any suitable conventional means, not shown. The "free" space above the ceiling accommodates raceways, not shown, to distribute power and communications wiring to the service pole assembly and from there to points-of-use within the room.

In the specifically illustrated embodiment, the pole 20 includes an access opening 22 on one side opposite the T-bar 18 and which is normally enclosed by a cover 24 extending the full length of pole 20. The cover 24 snap fits into position when tabs 26, 26 extending from an inside face of the cover 24 are cammed over confronting tongues 28, 28 which project along opposed interior walls of the pole 20 and define the access opening 22. The access opening 22 is normally used for laying in telephone cable 30 incoming from above the ceiling 14, and any suitable opening, not shown, is provided adjacent the bottom of pole 20 for the telephone cable 30 to exit. An interior web 32 within the pole 20 isolates the telephone side from the power side of the pole which is provided with power receptacles 34 and is normally pre-wired to connect to an overhead service line 36 incoming to a power junction box 38 mounted at the top of pole 20.

To compensate for movement of the suspended ceiling 14 toward and away from the floor 12 without applying corresponding loading on the pole 20 and to thereby minimize any tendency of its being lifted off the floor or being otherwise distorted, the service pole assembly 10 features a connector 40 operatively mounted between a hanger 42 and the pole 20 and cooperating with the hanger 42 in not only maintaining the pole 20 in an upright position but additionally providing for relative movement of that hanger 42 longitudinally along pole 20 in response to a corresponding movement of the ceiling suspension member 18 relative to the floor 12.

To automatically effect self-compensating adjustment of the assembly 10 upon ceiling distortion, the connector 40 has a bracket 44 attached to hanger 42 for free sliding movement on the pole. The hanger 42 is preferably of a two-piece construction which in the illustrated embodiment is shown as having a clamping jaw 46 extending downwardly and offset from a support plate 48 and a separate opposed C-shaped clamping jaw 50, the jaws 46 and 50 engaging and securing therebetween a web 52 of the T-bar 18. The bracket 44 has a generally U-shaped slide collar 54 embracing the pole with one leg of collar 54 extending through a slot 56 in the hanger support plate 48. A depending offset flange 58 extends downwardly from an intermediate connector between the legs of collar 54 and into overlying relation to clamping jaw 50. A suitable fastener such as bolt 60 extends through both clamping jaws 46, 50 which are secured in operative clamping engagement with the T-bar 18 by tightening the illustrated wing nut 62 on bolt 60. To ensure a loose fit of the bracket 44 on pole 20 to permit longitudinal sliding movement of hanger 42 relative to pole 20, a spacer bar 64 extends across the face of the cover 24 and is removably secured to projecting free ends of the legs of the U-shaped slide collar 54. To permit removal of bracket 44 for facile disassembly of cover 24 from pole 20 whenever desired, hook-headed bolts 66, 66 extend through offset feet of the spacer bar 64 and through the free ends of the collar 54 and are secured by wing nuts 68, 68.

By virtue of the above described construction, it will be seen that any movements of the T-bar 18 and attached hanger 42 relative to the floor 12 will be automatically compensated by following movements of the connector bracket 44 without transmitting any ceiling distorting load to the pole 20 while continuing to maintain the pole in upright operative position.

To provide an assembly of significantly improved stability, the connector 40 is shown having a second bracket illustrated as a C-shaped clamping bracket 70 adjustably mounted on pole 20 above the slide collar 54, and an extension spring 72 having its opposite ends secured to an offset tongue 74 of hanger 42 and the clamping bracket 70 is provided to effectively bias the pole 20 into floor bottoming engagement. The C-shaped clamping bracket 70 is shown having a bolt 76 extending through leg 70A of the bracket 70 and threadably engaging a retaining nut 78 captured against rotation within a slot 80 in the clamping bracket leg 70A. During installation, clamping bracket 70 is selectively positioned on pole 20 at a distance above hanger 42 to establish a predetermined spring force urging pole 20 into floor bottoming engagement. Thereupon an exposed flat thumbpiece on bolt 76 is manually turned to clamp opposite leg 70B of the clamping bracket 70 against pole 20 to secure the pole anchoring device in position.

The C-shaped clamping bracket 70 is illustrated as embracing the pole 20 in non-interfering relation to its removable cover 24. Upon installation, spring 72 is tensioned whereupon the connecting leg 70C of the clamping bracket is drawndown into tight fitting engagement (FIG. 3) against the pole, and upon any subsequent deflection of the ceiling 14 and hanger 42 relative to the pole 20, the slide collar bracket 44 is free to move longitudinally of the pole 20 as best illustrated in FIG. 5; the extension spring 72 will be accordingly stretched to increase the spring force urging the pole 20 into engagement with floor 12 without danger of buckling or otherwise distorting the service pole 20.

As will be apparent to persons skilled in the art, various modifications, adaptations and variations of the foregoing specific disclosure can be made without departing from the teachings of this invention.

I claim:

1. For installation in a room including a floor and ceiling suspension members relatively movable toward and away from the floor, a service pole assembly comprising an elongated hollow pole of sufficient length to extend from the floor above a ceiling suspension member, a pole hanger attachable in fixed relation to the ceiling suspension member, and a connector between the hanger and the pole, the connector including a first bracket attached to the hanger and supported for free sliding movement on the pole and a second bracket fixed to the pole above the hanger, and spring means connected between the hanger and the second bracket for urging the pole into floor bottoming engagement, the connector cooperating with the hanger in maintaining the pole in an upright position and providing for relative movement of the hanger longitudinally along the pole upon corresponding relative movement of the ceiling suspension member and the floor toward and away from each other.

2. The assembly of claim 1 wherein adjustment means is provided for selectively positioning the second bracket in fixed position on the pole for establishing a predetermined spring force for urging the pole into floor bottoming engagement.

3. For installation in a room including a floor and ceiling suspension members relatively movable toward and away from the floor, a service pole assembly comprising an elongated hollow pole of sufficient length to extend from the floor above a ceiling suspension member, a pole hanger attachable in fixed relation to the ceiling suspension member, and a connector between the hanger and the pole, the connector including a bracket attached to the hanger and supported for free sliding movement on the pole, the bracket comprising a spacer bar and a generally U-shaped slide collar, the slide collar attached to the hanger and embracing the pole, and the spacer bar removably secured to the free ends of the U-shaped slide collar and extending across one side of the pole, the connector cooperating with the hanger in maintaining the pole in an upright position and providing for relative movement of the hanger longitudinally along the pole upon corresponding relative movement of the ceiling supension member and the floor toward and away from each other.

4. The assembly of claim 3 wherein the connector further includes a C-shaped clamping bracket adjustably fixed on the pole above the slide collar, and an extension spring having its opposite ends secured to the hanger and the C-shaped clamping bracket, the latter being selectively positioned upon installation to provide a predetermined spring force for urging the pole into floor bottoming engagement.

5. The assembly of claim 4 wherein said one side of the pole is formed by a removable cover releasably mounted on the pole and enclosing an access opening to the interior of the pole, the C-shaped clamping bracket being in noninterfering relation to the cover and the spacer bar being removable to permit facile assembly and disassembly of the cover and pole.

6. For permanent installation in a room including a floor and ceiling suspension members relatively movable toward and away from the floor, a utility service pole assembly comprising an elongated hollow pole of sufficient length to extend from the floor above a ceiling suspension member, a movable pole hanger attachable in fixed overlying relation to the ceiling suspension member for movement therewith, the pole hanger being movable relative to the pole longitudinally along the pole, and a connector between the hanger and the pole, the connector including a resilient member disposed externally of the pole and having an upper end connected to the pole in fixed overlying relation to the hanger and an opposite lower end connected to the movable hanger, the hanger and resilient connector member cooperating with one another and biasing the pole in response to relative movement of the hanger longitudinally along the pole for urging the pole into floor bottoming engagement to maintain the pole in an upright position.

7. The assembly of claim 6 wherein the pole is attachable in fixed relation to the floor.

* * * * *